United States Patent [19]

Bishop

[11] Patent Number: 5,753,023
[45] Date of Patent: May 19, 1998

[54] METHOD FOR MANUFACTURE OF SMALL DIMENSION PRODUCT

[75] Inventor: Charles A. Bishop, Newby Middlesbrough, United Kingdom

[73] Assignee: Flex Products, Inc., Santa Rosa, Calif.

[21] Appl. No.: 640,005

[22] Filed: Apr. 30, 1996

[51] Int. Cl.$^6$ .................................................. C09C 1/28
[52] U.S. Cl. ................ 106/415; 106/31.65; 106/31.9; 106/401; 427/213; 427/214; 427/215; 427/218; 427/219; 427/255.1; 427/255.7; 427/294; 427/402; 427/419.2; 427/419.3; 428/403; 428/405
[58] Field of Search .................. 106/31.9, 31.65, 106/22 R, 401, 415; 428/403, 405; 427/213, 214, 215, 218, 219, 255.1, 255.2, 255.7, 294, 402, 419.2, 419.3

[56] References Cited

U.S. PATENT DOCUMENTS

| | | | |
|---|---|---|---|
| 3,861,946 | 1/1975 | Waitkins et al. | 106/415 |
| 3,910,033 | 10/1975 | Saito | 368/232 |
| 4,168,986 | 9/1979 | Venis, Jr. | 106/417 |
| 4,192,691 | 3/1980 | Armanini | 427/218 |
| 4,333,983 | 6/1982 | Allen | 428/336 |
| 4,434,010 | 2/1984 | Ash | 106/415 |
| 4,705,300 | 11/1987 | Berning et al. | 283/91 |
| 4,705,356 | 11/1987 | Berning et al. | 350/166 |
| 5,135,812 | 8/1992 | Phillips et al. | 428/403 |
| 5,171,363 | 12/1992 | Phillips et al. | 106/31.65 |
| 5,279,657 | 1/1994 | Phillips et al. | 106/31.65 |
| 5,302,199 | 4/1994 | Prengel et al. | 106/472 |
| 5,322,561 | 6/1994 | Prengel et al. | 106/472 |
| 5,364,467 | 11/1994 | Schmid et al. | 106/404 |

FOREIGN PATENT DOCUMENTS 39-25280  11/1964  Japan .................................. 106/415

OTHER PUBLICATIONS

JPO abstract of JP63-312969, Dec. 1988.
Derwent abstract 89-041897 of JP63-312969, Dec. 1988.
Abstract of JP 39-25280, Nov. 1964.
N.A.G. Ahmed, et al., A Simple and Inexpensive Rotating Barrel to Ion Plate Small Components (1984) J. Phys. E: Sci. Instrum., vol. 17, pp. 411–416. No Month.
Ostertag W., et al., BASF (Feb. 17, 1982) and Merck paper by S. Teaney and I. Denne, Color Formulations With Iriodin®/Afflair™ Pigments for Automotive Coatings (1992) (2) Kontakte (Darmstadt). No Month.

*Primary Examiner*—Mark L. Bell
*Assistant Examiner*—Scott L. Hertzog
*Attorney, Agent, or Firm*—Flehr Hohbach Test Albritton & Herbert LLP

[57] ABSTRACT

A method for manufacture of a small dimension product using a dissolvable crystal. The crystal is coated with at least one layer of vacuum deposited material to form a coated crystal. The coated crystal is mixed with a liquid to dissolve the crystal and permit the layer of material to break into flakes. The flakes are separated from the liquid.

22 Claims, 2 Drawing Sheets

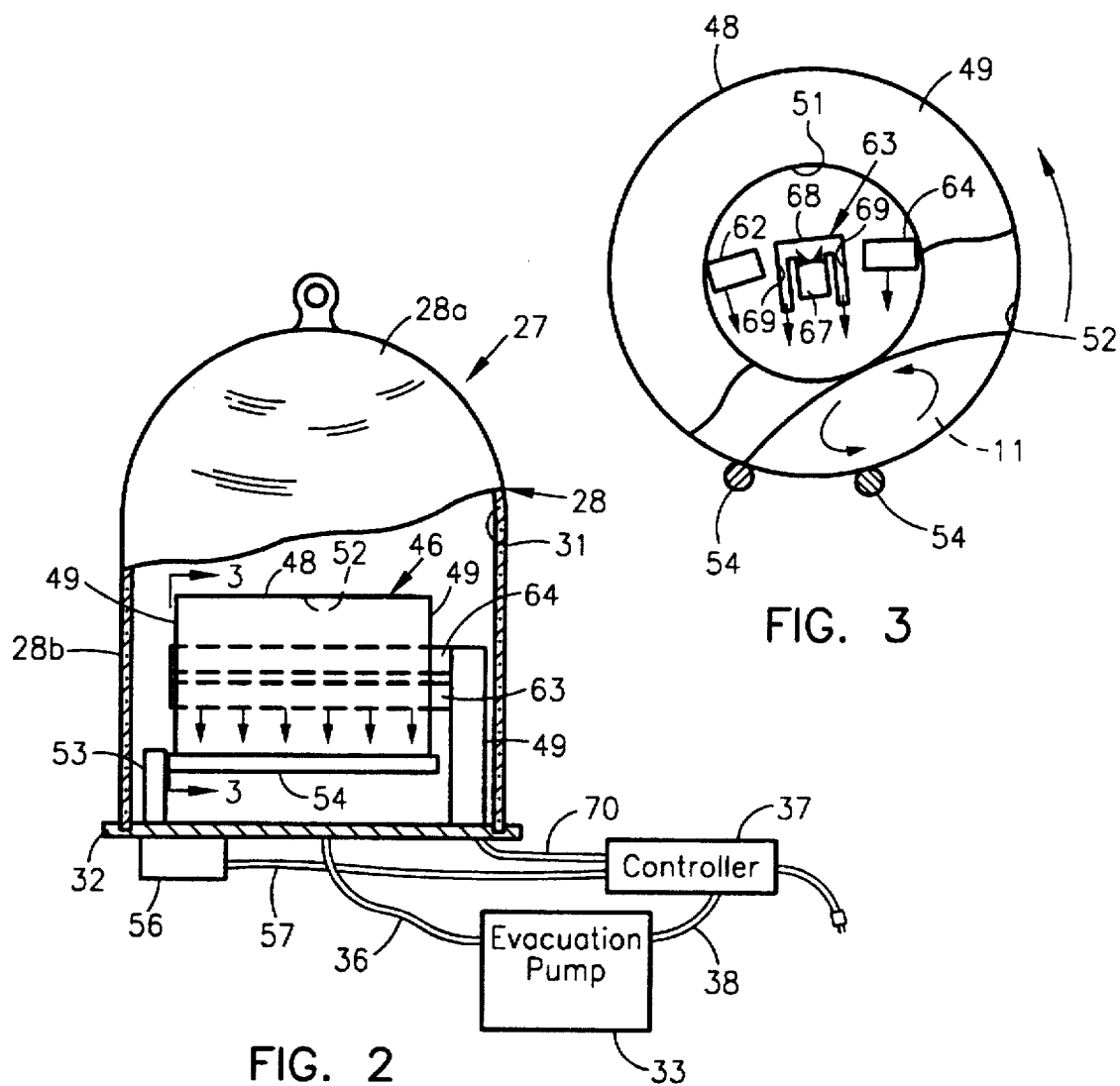
FIG. 3
FIG. 2
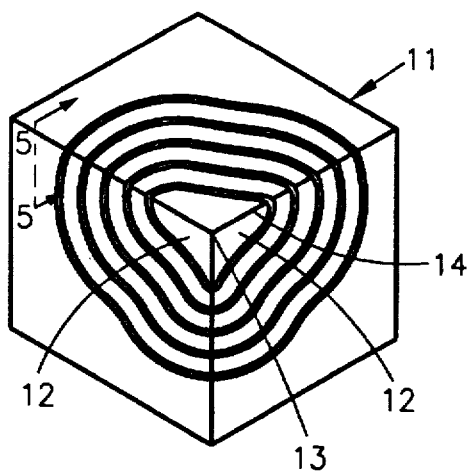
FIG. 4
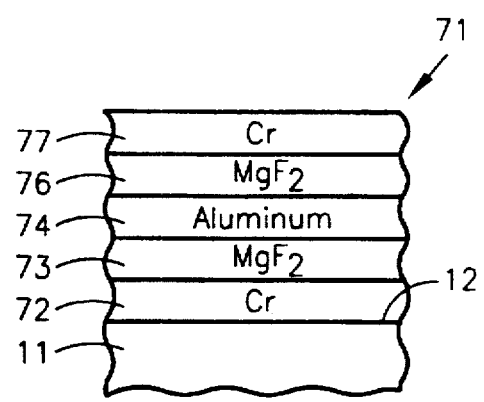
FIG. 5

METHOD FOR MANUFACTURE OF SMALL DIMENSION PRODUCT

This invention pertains generally to the manufacture of small dimension products and, more particularly, to the manufacture of multilayer interference coatings with optically variable properties.

Thin film optically variable devices are disclosed in U.S. Pat. Nos. 4,705,300 and 4,705,356. Small dimension products such as optically variable thin film flakes can be disposed in ink and paint vehicles to provide optically variable inks, paints and the like as disclosed in U.S. Pat. Nos. 5,171,363 and 5,279,657. Methods for forming thin film flakes and coatings are described in U.S. Pat. Nos. 4,333,983 and 4,434,010. In one commonly used method for producing such multilayer interference coatings, a coating is formed on a flexible web by means of a roll-to-roll vacuum web coating machine. The flexible web has a dissolvable interfacial layer thereon to permit separation and fracture of the coating. Such roll coaters, however, are high volume production machines which may not be required where only small quantities of product are needed. In addition, the relatively high expense of a roll coater can be an impediment to its utilization. Furthermore, roll coaters are complex and thus require many months from purchase to the time when manufacturing can commence. As can be seen from the foregoing, there is a need for a new and improved method for manufacturing small dimension product such as multilayer interference coatings.

In general, it is an object of the present invention to provide a method for manufacturing a small dimension product such as an optically variable pigment which utilizes dissolvable crystals as the substrate on which the pigment is formed.

Another object of the invention is to provide a method in which the dissolvable crystal substrate can be recycled in the method.

Another object of the invention is to provide a method of the above character which does not utilize a roll-to-roll vacuum web coating machine.

Another object of the invention is to provide a method of the above character which is economical for relatively small production runs.

Another object of the invention is to provide a method of the above character which is easily scalable for increased production.

Another object of the invention is to provide a method of the above character in which the start up time for manufacture is relatively short.

Additional objects and features of the invention will appear from the following description from which the preferred embodiments are set forth in detail in conjunction with the accompanying drawings.

BRIEF DESCRIPTION OF THE DRAWINGS

FIG. 2 is side elevational view, somewhat schematic and partially cut away, of a vacuum deposition assembly which includes a bell jar for use in the method of FIG. 1.

FIG. 3 is a cross-sectional view, partially cut away, taken along the line 3—3 of the vacuum deposition assembly of FIG. 2.

FIG. 4 is an isometric view, partially cut away, of a coated crystal formed in the method of FIG. 1.

FIG. 5 is a cross-sectional view taken along the line 5—5 of a portion of the coated crystal of FIG. 4.

Figure 1:
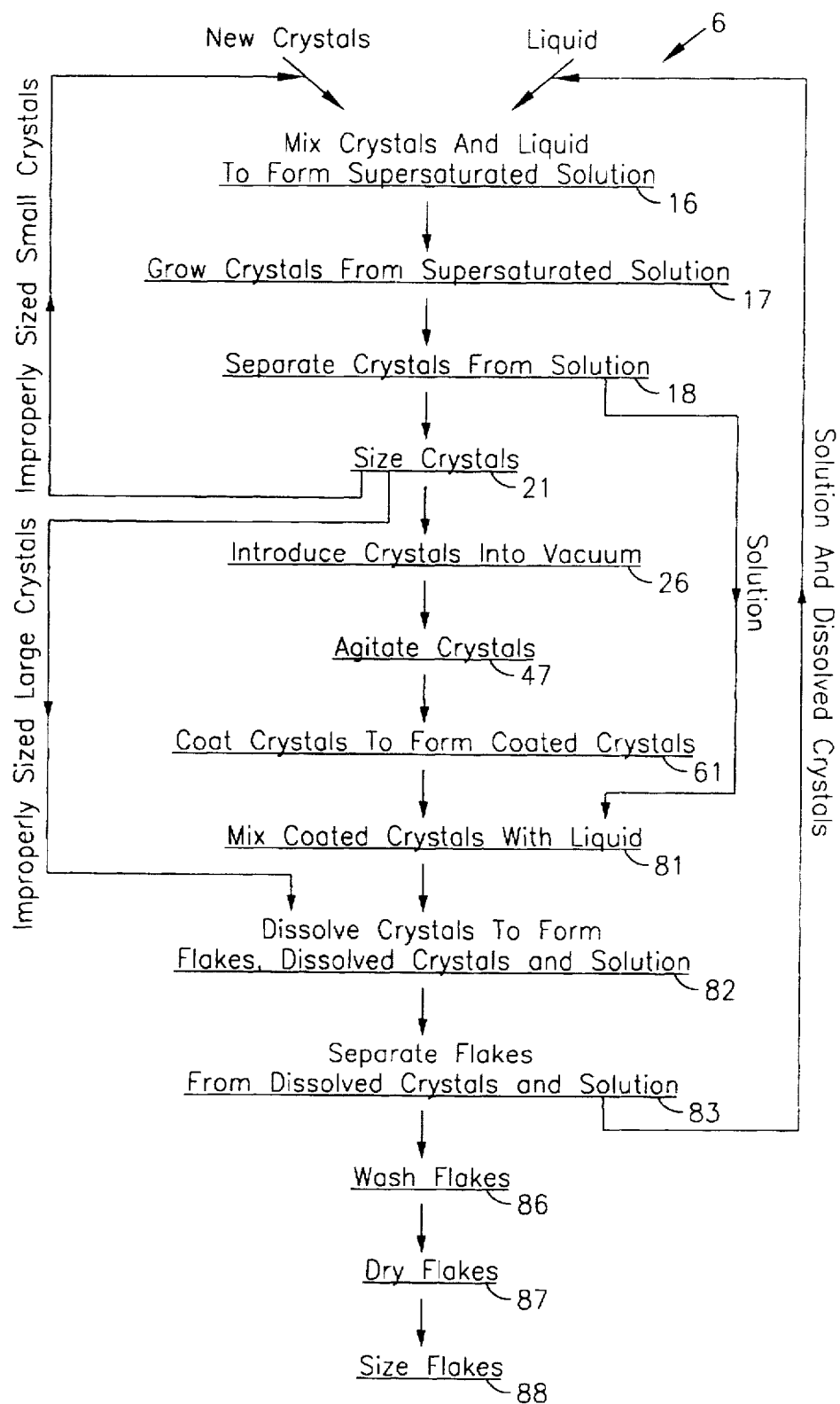
FIG. 1 is a flow chart of the method of manufacture of small dimension product such as optically variable pigment of the present invention.

In general, a method for manufacture of a small dimension product using a dissolvable crystal is provided. The crystal is coated with at least one layer of vacuum deposited material to form a coated crystal. The coated crystal is mixed with a liquid to dissolve the crystal and permit the layer of material to break into flakes. The flakes are separated from the liquid.

More in particular, method 6 for manufacture of small dimension product is described in the flow chart of FIG. 1. Method 6 therein utilizes dissolvable crystals having a shape suited to the formation of the particular small dimension product. Although the crystals can be of any shape, in the method for the manufacture of small dimension products in the form of optically variable pigments it is advantageous that the crystals each be in the form of a polyhedron having an outer surface formed from a plurality of planar faces. A particularly suitable crystal 11, illustrated in FIG. 4, has the general shape of a cube. Crystal 11 is formed from a plurality of planar surfaces or faces 12 joined at respective corners 13 and edges 14. Crystals 11 can be made from any suitable soluble material which is preferably nontoxic. An example of a suitable organic crystal is sugar. Examples of suitable inorganic crystals are chlorides, fluorides or nitrides such as common salt.

In mixing step 16, new or seed crystals are mixed with a liquid to form a supersaturated solution. Any suitable liquid can be utilized and, when the dissolvable crystals 11 are formed from salt or sugar, a desirable liquid would comprise hot water. In growing step 17, additional crystals are grown from the supersaturated solution and in separating step 18 the grown crystals 11 are separated from the solution by any suitable conventional means such as distilling the solution to maintain a supersaturation level followed by filtration. In sizing step 21, crystals 11 are separated by size into crystals having a proper size for utilization in method 6 and crystals 11 having an improper size for use in method 6. Improperly sized crystals which are too small are recycled back for use as seed crystals in mixing step 16 to grow additional crystals in growing step 17. Improperly sized crystals which are too large are dissolved in step 82 as discussed below. An example of suitably sized crystals 11 for use in manufacturing optically variable pigments have a transverse size, measured as the longest edge 14 of the crystal, ranging from 100 to 500 microns, preferably 100 to 200 microns and preferably approximately 100 to 125 microns.

Step 26 in method 6 consists of introducing crystals 11 into a vacuum. Vacuum or bell jar assembly 27 shown in FIGS. 2 and 3 can be utilized in this regard. Box coater or bell jar assembly 27 includes a conventional vacuum vessel or bell jar 28 for defining a vacuum chamber 31 and has a dome-like top portion 28a and a hollow cylindrical bottom part 28b. Bell jar 28 as shown is made from glass, however it can be made from any other suitable material such as metal. A disc-shaped base plate 32 made from metal or any other suitable material sealably engages the bottom opening of bell jar 28. Bell jar assembly 27 further includes an evacuation pump 33 in communication with vacuum chamber 31 by means of tubing 36. Evacuation pump 33 and vacuum vessel 28 are connected to a system controller 37 by wire 38. System controller 37 monitors vessel 28 and controls the pressure of the system and the introduction of any necessary gases as required by any desired reactive process.

Agitating means in the form of cooled rotating drum 46 is carried by base plate 32 within vacuum chamber 31 for performing agitating step 47 of method 6 (See FIGS. 2 and 3). Rotating drum 46 has a solid outer cylindrical wall 48 which is circular in cross-section and planar spaced-apart first and second end walls 49 with circular-shaped apertures 51 provided in the respective centers thereof. Walls 48 and 49 form an inner region 52 for carrying crystals 11. Drum 46 is rotatably carried by a post 53 secured to base plate 32 in spaced-apart positions. Spaced-apart first and second drive rollers 54 are mounted to post 53 for rotating drum 46 about its central longitudinal axis as shown by the arrow (not numbered) in FIG. 3. Drum 46 rests on rollers 54. A motor 56 is mounted to the underside of base plate 32 for driving rollers 54. System controller 37 is electrically connected to motor 56 by means of wire 57. The tumbling action of crystals 11 within drum 46 is depicted by the arrows (not numbered) in FIG. 3.

In coating step 61 of method 6, crystals 11 are coated with at least one layer of material while tumbling at the bottom of drum 46 to form coated crystals. When the small dimension product being manufactured by method 6 is an optically variable pigment, tumbling crystals 11 are sequentially coated on planar faces 11 with a plurality of materials to form a multilayer interference coating with optically variable properties. For this application, a plurality of three vacuum deposition sources 62, 63 and 64 are mounted on a second post 66 secured to base plate 32 and extending up along the opposite end of drum 46 from first post 53. The vacuum deposition sources extend through central aperture 51 in one of drum end walls 49 and face downwardly into inner region 52 of drum 46 as shown by the arrows (not numbered) in FIG. 2. As shown more specifically by the arrows (not numbered) in FIG. 3, the vacuum deposition sources are mounted in spaced-apart positions and are angled downwardly toward one side of drum 46 so as to direct material at the tumbling crystals 11 gathered along the side of the drum 46.

The vacuum depositing step of method 6 can be accomplished by any suitable means such as by evaporation, sputtering or chemical vapor deposition. Deposition sources 62, 63 and 64 can all be one type of said deposition sources or they can be any combination of said deposition source types. Deposition source 63 is shown in FIG. 3 as being an evaporation source having a material 67 evaporating upwardly. Top wall or cap 68 and nozzles 69 formed along each side of source 63 are hot and thus serve to direct the evaporated material 67 downwardly toward the bottom of rotating drum 46.

System controller 37 in conjunction with evacuation pump 33 serve to provide a suitable negative pressure and other conditions within vacuum chamber 31 for the selected deposition source(s). The system controller 37 is connected to deposition sources 62, 63 and 64 by means of wire 70 to regulate the timing and length of the duty cycle for each deposition source and thus make certain that the layer(s) applied by each such deposition source has the proper thickness. A rate monitor can be included within system controller 37 to aid in regulating the thickness of the deposited layers. The continuous tumbling and agitation of crystals 11 during the operation of deposition sources ensures that crystals 11 are uniformly coated with each of the deposition materials. The duration of the duty cycle of the deposition sources is primarily dependent upon the deposition rate and the surface area to be coated.

It should be appreciated that more than three layers can be applied by deposition sources 62, 63 and 64 and be within the scope of the present invention. For example, as illustrated in FIGS. 4 and 5, a five layer interference coating can be created within bell jar assembly 27 by repeating the operation of certain of the vacuum deposition sources. Multilayer interference coating 71 shown herein, and more specifically described in copending applications Ser. No. 08/231,396 filed Apr. 22, 1994, now U.S. Pat. No. 5,569,535, consists of a first semi-opaque layer 72 of a suitable material as for example a metal such as chromium (Cr). Semi-opaque layer 72 is deposited onto the outer surface of crystal 11 to a suitable thickness ranging from 50–150 Å and preferably a thickness of approximately 70 Å. Thereafter, a suitable dielectric layer 73 such as magnesium fluoride ($MgF_2$) having an index or refraction of 1.38 is formed to a thickness of four quarter wavelengths at a design wavelength of 550 nanometers. This is followed by an opaque reflecting metal layer 74 of a suitable material, such as aluminum. However, it should be appreciated that if desired, a semi-opaque metal layer 74 can be provided. Typically such a metal layer becomes opaque at approximately 350–400 Å. It should be appreciated that there are a number of other reflecting materials which can be utilized in the place of aluminum such as silver, copper or gold and the like depending upon the color effects desired. After reflecting layer 74 has been deposited, a dielectric layer 76 is formed of the same material and of the same thickness as the dielectric layer 73 hereinbefore described. For instance, layer 73 can be formed of four quarter waves of magnesium fluoride at a design wavelength of 550 nanometers. This is followed by a semi-opaque layer 77 of the same type and thickness as the semi-opaque layer 72 and as hereinbefore described can be formed of chromium having a thickness of approximately 70Å.

As can be seen, interference coating 71 consists of a five layer coating formed from three materials. It should be appreciated, however, that the aluminum material of layer 74 can be replaced with chromium to provide a five layer interference coating formed from only two materials and be within the scope of the present invention. It should also be appreciated that a variety of other multilayer interference coatings or multilayer coatings can be formed in method 6, some requiring less than three or more than three vacuum deposition sources, and be within the scope of the present invention.

Following the formation of the layered structure on crystal 11, bell jar assembly 27 is brought back up to air pressure and the coated crystals removed from rotating drum 46. In mixing step 81, the coated crystals are then placed in any suitable liquid such as the solution derived from separating step 18. In dissolving step 82, the coated crystals dissolve within the liquid of mixing step 81. A crystal 11 with a reasonably steep dissolution profile is advantageous in this regard. As noted above, crystals 11 sorted in separating step 18 which are deemed too large are mixed into the solution and dissolve in step 82 for reuse in method 6.

The layered structure created about each soluble crystal 11 fractures during dissolution. The crystal growth has imperfections at the intersection of its faces which create stress risers during dissolution. These stress risers encourage fracture of the crystal growth along the imperfections to thus form a plurality of generally planar flakes. A pronounced angle at the corners of coating 71, such as an angle of 90°, facilitates proper breaking of coating 71 at such corners. Multilayer interference coating 71 formed about each crystal 11 fractures to form a plurality of small dimension products in the form of optically variable flakes. These flakes replicate faces or surfaces 12 of crystals 11 and are thus generally planar in conformation.

In separating step 83, the dissolved crystals and solution are decanted off so as to separate the flakes from the dissolved crystals and the solution. As shown in FIG. 1, the dissolved crystals and solution can be recycled back to growing step 16 for use in forming a supersaturated solution to grow additional crystals in growing step 17. The optically variable flakes provided in separating step 83 are washed in washing step 86 and dried in drying step 87. A sizing step 88 can be provided for segregating undesirably sized flakes from ones suitable for use as pigment. Properly sized multilayered flakes can be used for a pigment in an optically variable ink or paint. As noted above, a sizing step may not be required if only crystals 11 of proper size and shape are used in method 6.

The multilayer structure of the pigment so formed in method 6 is created in a single vacuum. The method as described is a closed loop system in that improperly sized crystals 11 are recycled back for use in growing additional crystals. In addition, solution from which the grown crystals are separated can be used for dissolving the crystals once they have been coated. In addition, the solution containing the dissolved crystals can be recycled back into the method for growing additional crystals. This recycling of support structure on which the micro-structure or small dimension product is formed reduces the relative cost of the final product.

Method 6 serves to increase significantly the yield of a conventional bell jar operation. In general, the yield increase multiple is related to the number of planar faces on the crystal being used. Accordingly, the six faces of a cubic crystal 11 increase the yield of each operation approximately sixfold.

Cubic crystals 11 are additionally advantageous because of the uniformity in size and shape of each cube face 12. Since the aspect ratio between faces of a cube is 1 to 1, cubic crystals 11 narrow the variation in flakes produced. As such, the maximum size of the flakes produced is limited and the amount of downstream processing which may otherwise be required to segregate improperly sized flakes and break-up oversized flakes is reduced. The flakes produced through the use of cubic crystals 11 have the proper aspect ratio required for optically variable flakes.

Although method 6 has been described as utilizing bell jar assembly 27 and rotating drum 46 for agitating and tumbling crystals 11 in a vacuum during coating, it should be appreciated by those skilled in the art that other conventional means such as a fluidized bed can be utilized for agitating crystals in an evacuated environment during coating.

Method 6 can also be used for forming single layer coatings on crystals to thus form single layer small dimension products or flakes. Such an application of method 6 can include the formation of single layer metals, oxides, nitrides or other inorganic layers. Specific examples include the manufacture of single layers of indium tin oxide or titanium nitride.

From the foregoing, it can be seen that a new and improved method has been provided for manufacturing small dimension products such as optically variable pigment. The method utilizes dissolvable crystals as a substrate on which the pigment is formed. The dissolvable crystal substrate is not a component part of the final product but instead is recycled in the method. The method does not require or utilize a roll-to-roll vacuum web coating machine and is economical for relatively small production runs. The method is easily scalable for increased production. The simplicity of the equipment required for performing the method permits a start-up time for manufacture which is relatively short.

What is claimed is:

1. A method for manufacture of a small dimension product using a dissolvable crystal which is not platelet-shaped comprising the steps of coating the crystal with at least one layer of vacuum deposited material to form a coated crystal, mixing the coated crystal with a liquid to dissolve the crystal and permit the at least one layer of material to break into flakes and separating the flakes from the liquid.

2. The method of claim 1 wherein the dissolvable crystal consists of an inorganic crystal material.

3. The method of claim 2 wherein the dissolvable crystal consists of a salt crystal.

4. A method for manufacture of a small dimension product using a dissolvable crystal of an organic material comprising the steps of coating the crystal with at least one layer of vacuum deposited material to form a coated crystal, mixing the coated crystal with a liquid to dissolve the crystal and permit the at least one layer of material to break into flakes and separating the flakes from the liquid.

5. The method of claim 4 wherein the dissolvable crystal is a sugar crystal.

6. The method of claim 1 wherein the coating step includes applying the at least one layer of material to the crystal in a vacuum formed within a bell jar.

7. The method of claim 1 wherein the coating step includes sequentially applying a plurality of layers to the crystal.

8. The method of claim 7 wherein the plurality of layers are applied to the crystal in the same vacuum.

9. The method of claim 7 wherein the plurality of layers form a multilayer interference coating having optically variable properties.

10. The method of claim 9 wherein the flakes form an optically variable pigment for use in ink or paint.

11. A method for manufacture of a small dimension product using a water-soluble crystal having a plurality of faces comprising the steps of coating the crystal from a vacuum deposition source with at least one layer of material to form a coated crystal, the coating step including the step of agitating the crystal so that various faces of the crystal are exposed to the vacuum deposition source, mixing the coated crystal with a liquid to dissolve the crystal and permit the at least one layer of material to break into flakes and separating the flakes from the liquid.

12. The method of claim 11 wherein the agitating step includes tumbling the crystal in a rotating drum.

13. The method of claim 11 wherein the agitating step includes tumbling the crystal in a fluidized bed.

14. A method for manufacture of a small dimension product using a plurality of discrete water-soluble crystals comprising the steps of coating the plurality of discrete crystals with at least one layer of vacuum deposited material to form a plurality of coated crystals, mixing the coated crystals with a liquid to dissolve the crystals but not the at least one layer of material and permit the at least one layer of material to break into flakes, separating the flakes from the liquid to form a liquid free of flake residue and growing additional discrete crystals in the liquid free of flake residue.

15. The method of claim 14 further comprising the step of separating the additional crystals from the liquid to permit the solution to be mixed with additional coated crystals.

16. The method of claim 14 further comprising the step of sizing the additional crystals to separate properly sized crystals from improperly sized crystals.

17. The method of claim 16 further comprising the step of utilizing improperly sized crystals to grow further additional crystals for use in the method.

18. A method for manufacture of an optically variable pigment using a water-soluble crystal having an outer surface with a plurality of planar faces comprising the steps of vacuum depositing a plurality of layers onto the outer surface of the crystal to form a coated crystal having a multilayer interference coating on the outer surface of the crystal which reflects a first single color at a first angle of viewing incidence and a second single color at a second angle of viewing incidence, mixing the coated crystal in a liquid to dissolve the crystal and thus form a solution and permit the multilayer interference coating to fracture into optically variable flakes and separating the optically variable flakes from the solution to permit the optically variable flakes to be used as a pigment in a vehicle.

19. The method of claim 18 wherein the crystal has the general shape of a cube.

20. The method of claim 18 wherein the separating step includes separating the optically variable flakes from the solution to permit the optically variable flakes to be used as a pigment in an optically variable ink or paint.

21. A method for manufacture of optically variable pigment flakes comprising supplying a plurality of water-soluble crystals formed of a crystalline material each having a plurality of planar faces, depositing in a vacuum on each of the planar faces a multilayer interference coating and supplying a liquid to the crystals to dissolve the crystalline material to provide a plurality of platelets from each crystal formed solely of the multilayer interference coating.

22. The method of claim 21 wherein the liquid supplied is essentially water.

* * * * *